(12) United States Patent
Beerse et al.

(10) Patent No.: US 8,578,281 B2
(45) Date of Patent: Nov. 5, 2013

(54) INVITING TEMPORARY PARTICIPANTS TO A VIRTUAL MEETING OR OTHER COMMUNICATION SESSION FOR A FIXED DURATION

(75) Inventors: Chelsea Beerse, Fairport, NY (US); Arno Denne, Dublin (IE); Patrick O'Sullivan, Dublin (IE); Jeffrey Sloyer, Fishersville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/483,318

(22) Filed: May 30, 2012

(65) Prior Publication Data

US 2012/0239748 A1    Sep. 20, 2012

Related U.S. Application Data

(63) Continuation of application No. 12/968,983, filed on Dec. 15, 2010.

(51) Int. Cl.
*G06F 3/048*    (2013.01)
*G06F 15/16*    (2006.01)

(52) U.S. Cl.
USPC .......................................... 715/756; 715/755

(58) Field of Classification Search
USPC ................................................. 715/756, 758
See application file for complete search history.

(56) References Cited

U.S. PATENT DOCUMENTS

| | | | |
|---|---|---|---|
| 6,839,417 | B2 | 1/2005 | Weisman et al. |
| 7,804,948 | B2 | 9/2010 | Turner |
| 2004/0028199 | A1* | 2/2004 | Carlson .................... 379/93.21 |
| 2005/0238156 | A1* | 10/2005 | Turner .................... 379/202.01 |
| 2006/0077311 | A1 | 4/2006 | Renneberg |
| 2008/0086564 | A1* | 4/2008 | Putman et al. ................ 709/227 |
| 2010/0189238 | A1* | 7/2010 | Gupta .................... 379/202.01 |
| 2010/0306676 | A1* | 12/2010 | Srinivasaraghavan et al. ............................ 715/758 |

FOREIGN PATENT DOCUMENTS

| | | |
|---|---|---|
| KR | 2005077592 A | 8/2005 |
| WO | 2008019087 A2 | 2/2008 |

OTHER PUBLICATIONS

Tran Tuan Anh, et al., "Push to Talk over Cellular Traffic Modeling," 2006.

* cited by examiner

*Primary Examiner* — Andrea Leggett
(74) *Attorney, Agent, or Firm* — Patents on Demand P.A.; Brian K. Buchheit; Scott M. Garrett

(57) ABSTRACT

A session invitation can be received from a first communicator for a first communication session. The session invitation can be for a temporary participant to join a sub-session of the first communication session for a sub-session duration specified by the first communicator. The sub-session duration can be less than a duration of the first communication session. The session information can be conveyed to the temporary participant within a session invitation so that the sub-session duration is able to be presented to the temporary participant. Thus, the temporary participant is able to accept or deny the session invitation with full knowledge of the sub-session duration.

20 Claims, 3 Drawing Sheets

INVITING TEMPORARY PARTICIPANTS TO A VIRTUAL MEETING OR OTHER COMMUNICATION SESSION FOR A FIXED DURATION

CROSS-REFERENCE TO RELATED APPLICATION

This application is a continuation of U.S. patent application Ser. No. 12/968,983, filed Dec. 15, 2010 (pending), which is incorporated herein in its entirety.

BACKGROUND

The present invention relates to the field of real-time communications and virtual meetings.

Many communication solutions today leverage information technology (IT) and telephony assets to improve collaboration and business processes. Advances in communicating via voice, video, and data on IP networks are fundamentally transforming the way people work. For instance, use of virtual meetings, online collaboration, Instant Messaging, video conferencing, voice conferencing, and the like have proven to be efficient substitutes for in-person meetings. The convenience of today's communication tools can result in increased contacts among a set of remotely located people. If improperly used, these increased contacts and communications can represent a set of interruptions, which may hamper a person's ability to conduct daily business transactions.

BRIEF SUMMARY

One aspect of the disclosure can include a method, computer program product, apparatus, and system. In this aspect, a session invitation can be received from a first communicator for a first communication session. The session invitation can be for a temporary participant to join a sub-session of the first communication session for a sub-session duration specified by the first communicator. The sub-session duration can be less than a duration of the first communication session. The session information can be conveyed to the temporary participant within a session invitation so that the sub-session duration is able to be presented to the temporary participant. Thus, the temporary participant is able to accept or deny the session invitation with full knowledge of the sub-session duration. The temporary participant can respond by accepting the session invitation. This invitation response can be received, where the response indicates that the temporary participant has elected to join the first communication for the sub-session duration. In response, the temporary participant can be joined to the first communication session. Duration information can be provided to at least the first communicator and the temporary participant so that a count-down for the sub-session duration is able to be presented upon user interfaces of the first communicator and the temporary participant. A time that the sub-session duration ends (and/or an event indicating the end of the sub-session duration) can be determined. Responsive to this determination, the temporary participant can be automatically removed from the first communication session.

One aspect of the disclosure can include a computer program product and/or user device having a user interface. The user interface can be one through which a user is able to participate in real-time communication sessions conducted with sets of one or more remotely located people. The user interface can include an invitation acceptance screen, a bidirectional communication component, a countdown screen, an auto-termination component, and/or the like. As used herein, screen is used to present a user interface element, which can include a graphical user interface element, a text user interface element, a voice user interface element, and the like. A screen can be a specific division of a display or voice prompt, or can be integrated with other interface components.

In the aspect, the invitation acceptance screen can present a session duration at a time of prompting a user to accept or deny an invitation to join an ongoing communication session. The session duration can represent a duration which the user is to be part of the ongoing communication session should the user accept the invitation. The bidirectional communication component can permit the user to bidirectionally communicate during the ongoing communication session. The user can be automatically joined to the ongoing communication session responsive to acceptance of an invitation via the invitation acceptance screen. The countdown screen can present a user with a continually decrementing countdown time representing an amount left in the session duration. The countdown screen can be presented to a user during the ongoing communication session conducted through the bidirectional communication component. The auto-termination component can automatically disconnect the user from the ongoing communication session at a time that the session duration expires.

DETAILED DESCRIPTION

Figure 1:
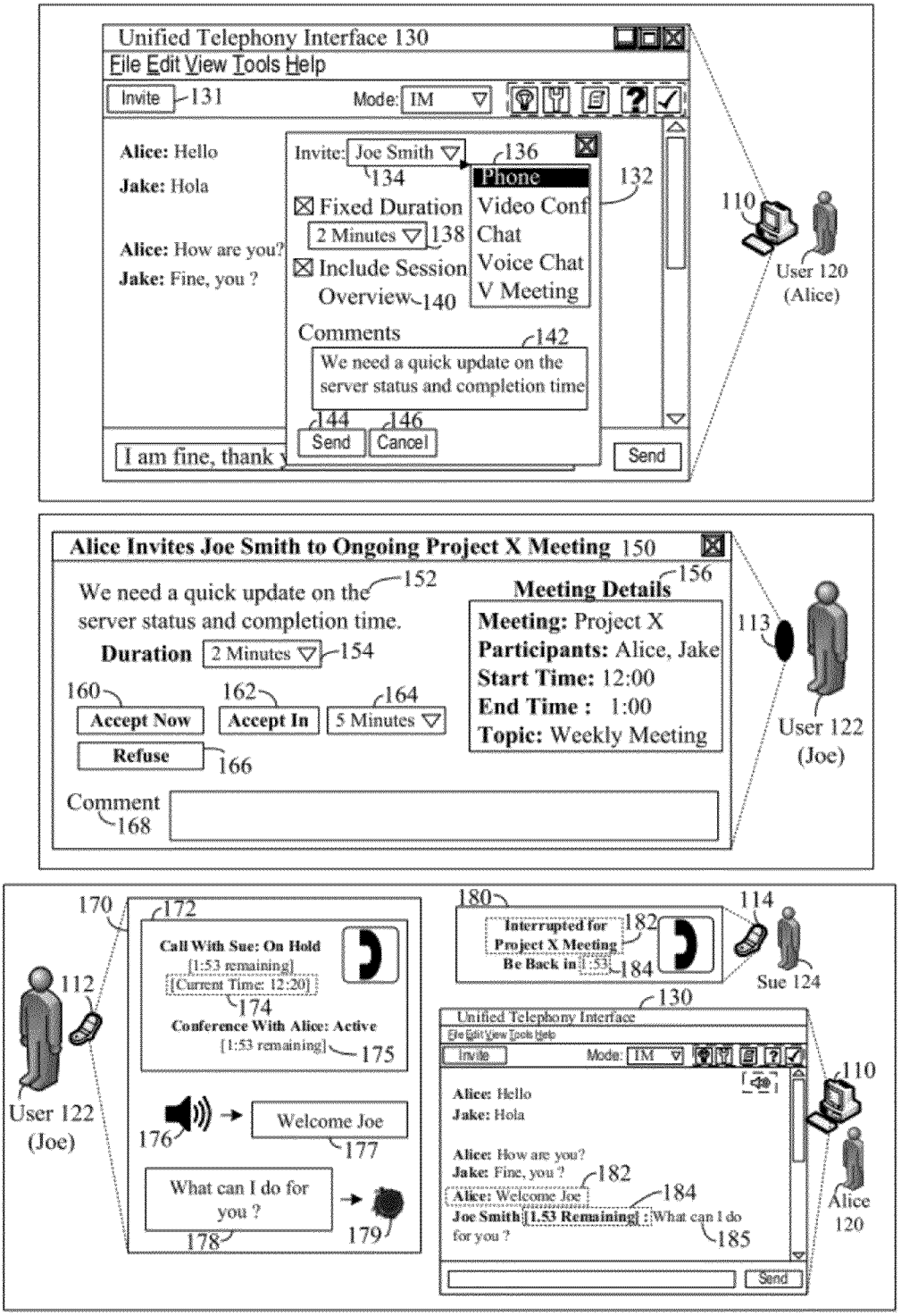
FIG. 1 shows a diagram in which an invitation to a virtual meeting or other real time communication is conveyed and accepted, where the invitation is subject to a fixed duration.

With advances in communication tools, such as unified telephony, video meeting, video conferencing, online collaboration, and the like, comes a downside of increased interruptions. That is, an improved ability to remotely communicate in a cost effective manner leads directly to increased interruptions during a workday. Improved tools are needed to manage communications that minimize interruptions. The need for these tools is only expected to increase as collaborative practices, virtual networking, social networking, and other communication technologies grow.

The disclosure presents a communication tool that adds an ability to include a fixed duration with a communication invitation for a virtual meeting or other real-time communication session. This fixed duration can be established by a person initiating the invitation and can be presented to the receiver of the invitation. In one embodiment, the receiver of the invitation can renegotiate the fixed duration. The fixed duration can be for less than the duration of the virtual meeting. In one embodiment, the invitation can be conveyed during the virtual meeting and/or at a time the invitee is engaged in a different conference, virtual meeting, or other real time communication. When the invitee accepts the fixed duration invitation, any pending communication can be placed on hold, to be automatically resumed at the end of the fixed duration. In one embodiment, a countdown of the fixed duration can be presented to the invitee and to participants of any affected communication.

It should be appreciated that the disclosure permits a temporary participant to be guaranteed a duration before agreeing to enter a communication session. This capability can be extremely beneficial in many scenarios, such as permitting an expert jump into a virtual meeting, provide needed expertise, and jump out of virtual meeting all while keeping interruptions to the flow of the meeting and to the interruptions to the expert's schedule to a minimum.

In one embodiment, decisions can be made about whether or not an existing communication is to be interrupted based on a computed relative importance level (or priority) of each communication. For example, if an existing communication is determined to be more important than one for which an interruption is being requested, the interruption may be denied immediately by a system (e.g., never presented to a user). In another example, if an incoming communication is significantly more important that an existing one, an automated system may automatically accept the interruption for the designated duration. Moreover, one embodiment of the disclosure can leverage knowledge about a hierarchical organization to determine relative importance of communications. For example, a higher priority can be established based on organizational identity (e.g., a vice president of an organization having a greater priority than a mid-level manager) and a determination to interrupt an existing communication can be based on whether the incoming communication has a higher priority than the existing one.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a diagram 100 in which an invitation 150 to a virtual meeting or other real time communication is conveyed and accepted, where the invitation is subject to a fixed duration. More specifically, in diagram 100, a set of users 120-124 communicate with one another over a network through computing devices 110-114. Each computing device 110-114 can provide a user interface 130, 150, 170, 180 through which user (users 120-124) to machine (device 110-114) interactions occur. The communications can occur in real-time or near real time in one embodiment of the disclosure. Further, the different user interfaces 130, 150, 170, 180 can utilize any of a plurality of different modalities when communicating, such as voice, graphical, textual, video, data, and the like. Communication modalities used by two different communicating users (120-124) may or may not be the same. In one embodiment, different options or actions can depend upon an importance level of a communication or set of communications. Thus, different reactions and actions can result, which bias the telephony system to favor more important communications over those of lesser import.

As shown in FIG. 1, user 120 (e.g., Alice) uses a unified telephony interface 130 functioning in an instant messaging mode. User 120 (e.g., Joe) uses a voice interface for communicating via voice and a visual display 172 for providing additional information. User 124 (e.g., Sue) uses a voice user interface 180. It is contemplated in the disclosure that different interfaces and devices 110-114 than those shown in diagram 100 can be used by any of the users 120-124, and the disclosure is not to be construed as limited in this regard.

The diagram 100 illustrates that an initial communication session (virtual meeting, voice conference, video conference, instant messaging session, chat session, co-browsing session, etc.) can be conducted with a set of people that includes user 120 (e.g., Alice) and that does not include user 122 (e.g., Joe) or 124 (e.g., Sue). During the meeting, a need or desire to temporarily include user 122 (e.g., Joe) to the session as a temporary participant can arise. User 120 can select an invite 131 option from interface 130, which results in a pop-up window 132 being presented.

In window 132, Joe Smith 134 is selected as an invitee. Different contact mechanisms for communicating with the invitee can be provided, as shown by graphical user interface (GUI) element 136. For example, Joe Smith (invitee 134) can be asked to join the communication session by phone, video conference, chat, voice chat, virtual meeting, and the like. In one embodiment, contact information for Joe Smith for specific devices and/or type of communication can be managed and utilized (e.g., from a master contact list) so that user 120 need not specify specific contact information (e.g., phone number, IM user name, video conference IP address, etc.). In another embodiment, user 120 may have to explicitly specify the address, phone number, or other identifier for a specific communication device 113, 112 associated with the invitee (e.g., Joe Smith).

User 120 can further specify a fixed duration 138 for the Joe Smith 134 to join the session. Effectively the fixed duration 138 can represent a sub-session, which occurs as part of the main session. Another option within window 132 can be to provide overview data or not along with the invitation. Further, user 120 can provide additional manually specified comments 142. A send 144 option can cause the invitation to be sent. Selection of the cancel option 146 can result in the invitation not being sent.

It should be understood that the options of window 132 are not intended to be comprehensive. For example, the window 132 can schedule a future time for the invitation. That is, the sub-session can begin at a user 120 designated start time and/or end at a user 120 designated start time (the end time can also be inferred from the duration 138. In one embodiment, a default time for the duration 138 can be programmatically determined. For example, it can be based on the comments 142, the purpose of the sub meeting, historical records, and the like.

The invited user 122 (e.g., Joe Smith) can receive the invitation via a user interface 150 of computing device 113. The user interface can present (visually and/or audibly, depending on interface 150 modality) the comment 152 (corresponds to comment 142) about the sub-meeting, a duration 152 (initially corresponds to duration 138), as well as meeting details 156 (assuming option 140 for presenting session overview was elected).

In one embodiment, the invitee 122 can change the duration 154 or other sub-meeting specifics before accepting the invitation. Accepting the invitation can be an immediate acceptance (through a selection of option 160, for example) or a delayed acceptance (through a selection of option 162, for example). When acceptance is delayed, a delay time can be specified, such as by selecting or inputting a delay time in GUI element 164. User 122 may also choose a refuse option 166 to refuse the invitation to the sub-session. User 122 provided comments 168 can be included in a refusal or an acceptance in one embodiment of the disclosure.

In one scenario, the user 122 can be engaged in a different communication session at an overlapping time with the sub-session. For example, Joe Smith can be talking via real-time voice with sue 124 at the time the invitation for an immediate sub-session with Alice 120 arrives. The device 113 upon which the invitation is presented may be the same or a different device 112 than that used to communicate with sue 124 or than the device 112 that is to be used to join the communication sub-session with Alice 120.

The participant(s) of the existing conversation (e.g., Sue 124) can be presented with a message 182 that their session with Joe Smith 122 has been temporarily interrupted for the duration 184. A count-down of the duration 184 can be shown in their interface 180. This count-down 184 can be time-synched with a count-down 174, 175 displayed to Joe Smith 122 and a count-down timer 184 displayed to each user 120 (e.g., Alice, Jake, etc.) of the sub-session. When the count-down timer ends, the Joe Smith 122 can be automatically disconnected from the sub-session (with Alice 120, and Jake) and Joe Smith 122 can automatically rejoin the interrupted communication session with Sue 124. In one embodiment, the count-down timer the sending of notification messages of the countdown, of the meeting interruption message, call (or communication session) establishment, halting, and resumption, and the like can be handled by a communication system with minimal to no manual user (120-124) actions being required.

Diagram 100 shows that a communication system can dynamically transcode or convert communication streams from one format to another during either of the communication sessions (the session with Sue 124 and/or the sub-session with Alice 120), in one embodiment. For example, user 122 can hear text 182 input by Alice 120 via an interface 130 as audible output 177 from a speaker 176. The user 122 can speak 178 into a microphone 179, where the spoken content is displayed as text 185 in interface 130.

Figure 2:
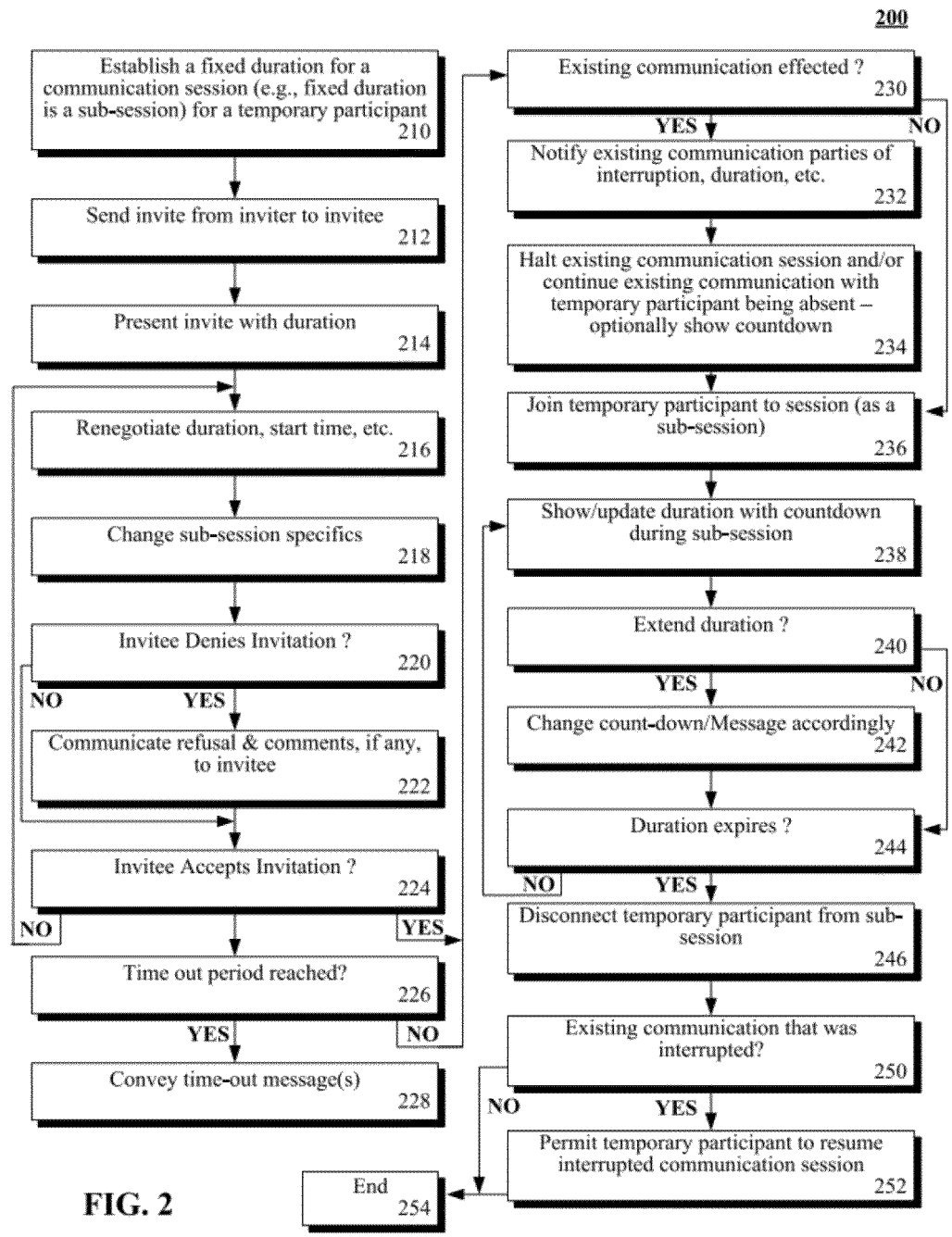
FIG. 2 shows a flow chart of a method for communication sub-sessions of fixed durations in accordance with an embodiment of the disclosure.

FIG. 2 shows a flow chart of a method 200 for communication sub-sessions (e.g., the sub-session involving Alice 120, Joe 122, and Jake in diagram 100) of fixed durations in accordance with an embodiment of the disclosure.

Method 200 can begin in step 210, where a duration for a sub-session can be specified for a specific temporary participant (e.g., user 122 of diagram 100). In step 212, an invitation can be sent to the temporary participant for the sub-session. In step 214, the invitation having the established duration can be presented to the temporary participant.

In step 216, the temporary participant can opt to renegotiate specifics of the sub-session. The renegotiated specifics can include, for example, the sub-session duration, start time, participant set, modality or device with which the temporary participant joins the sub-session, and the like. In one embodiment, whenever specifics are renegotiated, these changes can be conveyed back to the inviter, who may agree, disagree, make further changes, and the like, which are eventually agreed upon by all necessary parties. In step 218, sub-session specifics can be changed to reflect the renegotiated ones.

In step 220, the invitation may or may not be denied by the temporary participant. If the invitation is denied, the refusal and any associated comments provided by the invitee can be provided to the inviter, as shown by step 222. If the temporary participant does not accept the invitation in step 224 and has not denied the invitation in step 220, a time-out period for responding can occur, as shown by step 228.

If the invitation is accepted in step 224, the method 200 can progress to step 230, where the temporary participant may or may not be participating in an existing communication session. If there is an existing communication session, the parties of that session can be notified of the interruption, the duration of the interruption, and/or may be provided other information (e.g., the reason for the interruption), as represented by step 232. In step 234, the existing communication session can be halted for the duration or may continue without the temporary participant for the duration. A count-down expressing the duration can be optionally shown to participants of the existing communication session.

Regardless of whether an existing communication session is interrupted, the temporary participant can join the sub-session in step 236. As the sub-session progresses, a count-down until the end of the duration of the sub-session can be updated and optionally shown, as shown by step 238.

During this sub-session, one or more of the participants of the sub-session (e.g., sub-session moderator, temporary participant, etc.) may opt to change the duration of the sub-session, as shown by step 240. Changing this duration, may or may not require authorization by affected users (such as the temporary participant, a sub-session moderator, a leader of the interrupted session, etc.) depending on implementation specifics. When the sub-session specifics are changed, suitable changes to the count-down timer can be made and messages concerning the change can be sent to affected parties, as represented by step 242. Eventually, the count-down timer can expire (shown by progressing from step 244 to step 246), at which time the sub-session can end and the temporary participant can be disconnected from the sub-session, as shown by step 246. Other participants of the communication session, which the temporary participant joined, can continue with their session (which the temporary participant has been disconnected from) at this point. If there was an interrupted existing communication session (step 250), the temporary participant can resume his/her participation in this interrupted session automatically, as shown by step 254.

In one embodiment of the invention, a relative importance level of a conversation can affect specifics performed by method 200. The relative importance level of a conversation can be based on a variety of factors. One of these factors can include knowledge about hierarchical information of an organization. For example, if a vice-president invites a user to be a temporary participant in a conference, the method can show this invitation as having a high priority and indicate the user needs to join this conference regardless of other pending matters. Other factors can relate to specific content of the conversations, urgency levels established by conference initiators, and the like.

To elaborate, if a temporary participant is requested by a manager in his/her direct chain, options to renegotiate (step 216) can be intentionally limited. The contrary is true, in that very expansive options to renegotiate (step 216) can be provided to a user who is an organizational superior to the person issuing an invitation. Similarly, in one embodiment, automatically computed durations of a sub-session, a decision of whether to even show an invitation when a temporary participant is engaged in an existing communication, decisions regarding breadth and details of interruptions to present to others, and the like can vary based on relative importance values computed for communications and/or communication participants.

Figure 3:
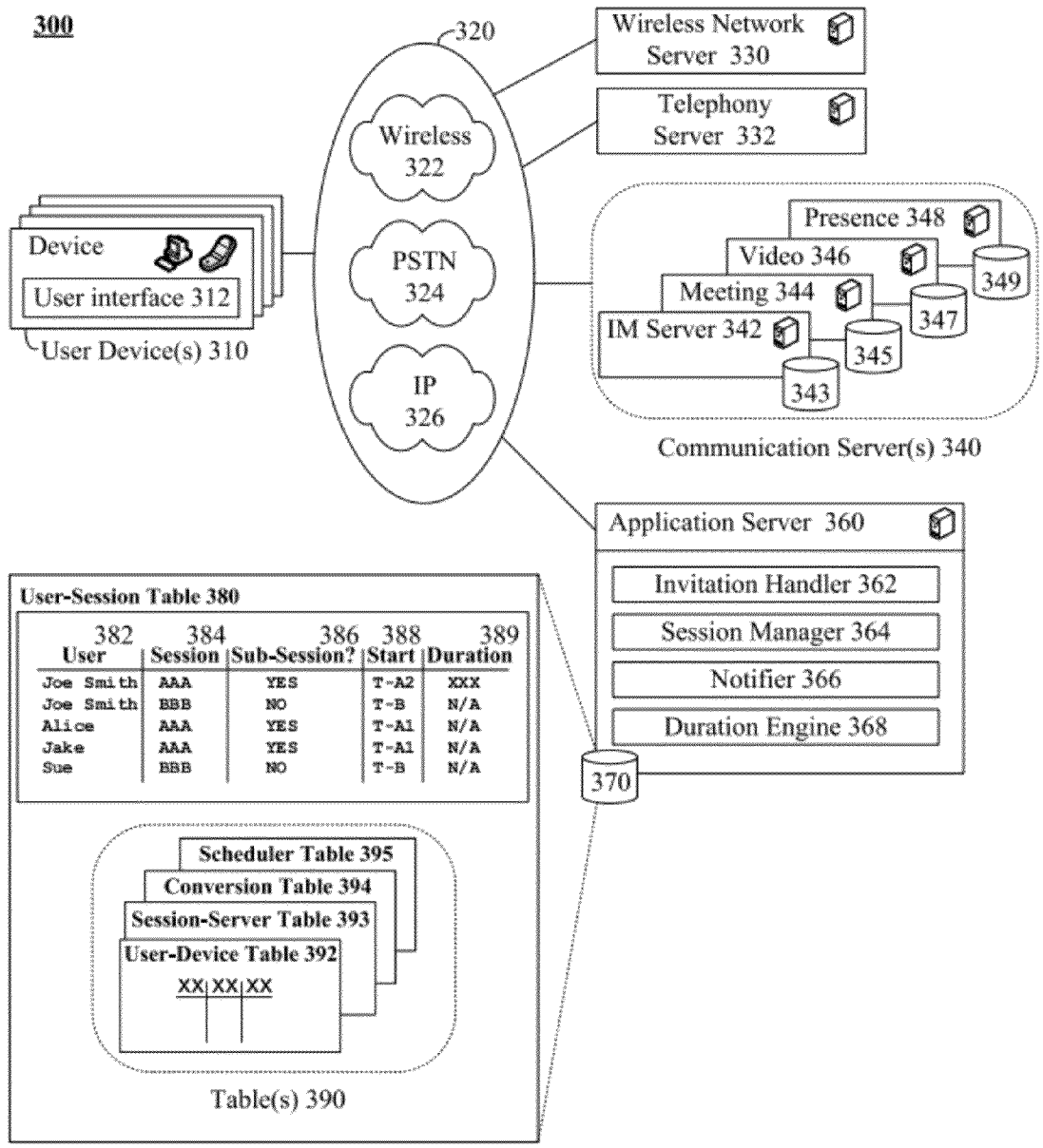
FIG. 3 shows a system for implementing communication sub-sessions having fixed durations in accordance with an embodiment of the disclosure.

FIG. 3 shows a system 300 for implementing communication sub-sessions having fixed durations in accordance with an embodiment of the disclosure. In one embodiment, system 300 can be a system that implements method 200. For example, an application server 360 can implement a fixed duration for a communication sub-session in which a temporary participant communicates with other session participants.

In system 300, a set of user devices 310 can be connected to a network 320. A number of servers, including a wireless network server 330, a telephony server 332, communication server(s) 340, and application server 360 can also be connected to the network 320. Various users of devices 310 can communicate with one another via the user interfaces 312 of the devices. These communications can be facilitated by one or more of the servers 330-360.

The user device(s) 310 can include phones, mobile phones, personal computers, media players, internet applicants, two-way radios, instant messaging terminals, and the like. Basically, a user device 310 can be any device through which a user (e.g., Alice, Joe Smith, Jake, Sue, etc. from FIG. 1) can interact. Different user devices 310 can include different types of user interfaces, such as a text user interface (TUI), a voice user interface (VUI), a graphical user interface (GUI), a multimodal interface, and the like. Thus, users can communicate via user interfaces 312 in different modalities, such as voice, text, video, interactive Web, and the like.

To elaborate, zero or more of the devices 310 can directly connect to a wireless network 322, such as a WIFI network, a WIMAX network, a mobile telephony network, a two-way-radio network, and the like. The wireless network server 330 can be connected to a backbone, such as Internet Protocol (IP) network 326. In one embodiment, the wireless server 330 can include carrier grade equipment. In another embodiment, the wireless server can include home grade equipment.

Zero or more of the devices 310 can be customer premise equipment (CPE) directly connected to the public switched telephone network (PSTN) 324. In one embodiment, the telephony server 332 can include carrier grade equipment, which links calls and other communications conducted over the PSTN 324 to an IP backbone 326.

Zero or more of the devices 310 can be internet enabled devices, which connect directly to an IP network 326.

The different communication servers 340 can be used to conduct numerous types of different communication sessions, such as instant messaging (1M) sessions, chat sessions, telephony sessions, voice over internet protocol (VoIP) sessions, video teleconferencing, co-browsing, and the like. The communication sessions can include real-time communication sessions in one embodiment. The different communication servers 340 that facilitate communications between user devices 310 can include an instant messaging (IM) server 342, a virtual meeting (or online meeting) server 344, a video conferencing server 346, a presence server 348, a Web server, a unified telephony server, a chat server, and the like. The various servers 342, 344, 346, 348 can each utilize information stored in a corresponding data store 343, 345, 347, and 349.

The application server 360 can interact with a set of different communication servers 340 in order to connect user devices 310 to a communication session, to disconnect a user from a communication session, to establish a communication session, to halt a communication session, and to perform other such actions. In one embodiment, the application server 360 can utilize application program interfaces (APIs) or other interfaces to convey data and commands to and from the various communication servers 340. In one embodiment, the application server 360 can be a JAVA 2 ENTERPRISE EDITION (J2EE) server and the functionality that permits duration specified sub-sessions for one or more of the communication servers 340 can be implemented as a software service (e.g., a Web service).

The application server 360 can include an invitation handler 362, a session manager 364, a notifier 366, a duration engine 368, and/or other components. Although the functionality of components 362, 364, 366, and 368 is shown as being implemented within application server 360 this is not a limitation of the disclosure. That is, in various embodiments, the functionality of one or more of the components 362, 364, 366, and 368 can be implemented by the communication servers 340 and/or a portion of the functionality can be implemented within one of the user devices 310 or within any device connected to network 320.

The invitation handler 362 can handle specifics for sending invitations from one user device 310 to another user device 310.

The session manager 364 can handle details and make changes to communication sessions managed by the communication server(s) 340. For example, the session manager 364 can add a user device 310 or remove a user device 310 to an existing session without terminating the session. In one embodiment, the session manager 364 can automatically remove one of the user devices 310 from a communication session when a fixed duration expires. In one embodiment, the session manager 364 can halt a communication session, pause a communication session, establish a communication session, and the like for one or more of the communication servers 340.

The notifier 366 can convey messages to and from the communication servers 340 in a format that each communication server accepts. In one embodiment, different plug-ins can be required for at least a portion of the communication servers 340 to facilitate the communication of messages. In one embodiment, the notifier 366 can utilize pop-up messages, voice messages, or messages conveyed within communication applications (using APIs of the applications for message-conveyances).

The duration engine 368 can establish a fixed duration for a sub-session. Further, the duration engine 368 can establish rules for extending a sub-session duration, such as requiring authorization before extensions of a sub-session are permitted. The duration engine 368 can establish a time at which a sub-session is to start and end. In one embodiment, the duration engine 368 can convey count-down notifications (with the cooperation of notifier 368) related to the duration and/or changes to the duration of a sub-session.

Data store 370 can maintain information used by the application server 360, which is related to the duration of a sub-session. For example, data store 370 can maintain information in a set of tables 380, 390 or other data structure. This information can include a use-session table 380, which includes records that relate users 382 to sessions 384. The information can indicate whether a communication session is a sub-session 386 or not, where a sub-session indicates a participant is to be automatically removed after a duration 389. Each record can further include a start time 388 for the session or sub-session.

Records of table 380 can be indexed against records maintained by other tables 392-395. For example, a user-device table 392 can maintain which set of devices 310 correspond to which user names/identities. A session-server table 393 can indicate which communication server 340 manages which of the communication sessions (384) and can include server-specific information for communicating between application server 360 and the related communication server 340. A conversion table 394 can indicate a manner in which communication data content (e.g., streams or other data) are to be converted when conveyed between user devices 310. The conversation table 394 can, for example, indicate IP addresses of text-to-speech servers, speech-to-text servers, and callable services for performing conversions during communication sessions. The schedule table 395 can include information related to schedules of users of devices 310. Schedules in any of the tables 395 can be affected by the interruptions represented by the sub-sessions. In one embodiment, sub-sessions can be scheduled in advance, such as using a meeting scheduling program, a task management program, and the like.

Each data store 343, 345, 347, 349 and 370 can be physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving a session invitation from a first communicator for a first communication session, wherein said session invitation is for a temporary participant to join a sub-session of the first communication session for a sub-session duration specified by the first communicator, said sub-session duration being less than a duration of the first communication session;
    conveying the session information within a session invitation to the temporary participant, so the temporary participant is able to accept or deny the session invitation with knowledge of the sub-session duration;

receiving an invitation response from the temporary participant that indicates the temporary participant has elected to join the first communication for the sub-session duration;

responsive to the invitation response and at a time that the sub-session is to start, joining the temporary participant to the first communication session;

providing sub-session duration information to at least the first communicator and the temporary participant so that a count-down for the sub-session duration is able to be presented upon user interfaces of the first communicator and the temporary participant during the sub-session;

determining a time at which the sub-session duration has ended; and responsive to determining that the sub-session duration has ended, automatically removing the temporary participant from the first communication session.

2. The method of claim 1, wherein the session invitation received by the temporary participant indicates that the temporary participant is desired to immediately join the first communication session, wherein the joining of the temporary participant to the first communication session is able to result in an approximate immediate joining if the invitation response so indicates.

3. The method of claim 2, wherein the invitation response comprises a time delay specified by the temporary participant;

said method further comprising: conveying the time delay to the first communicator so that it is able to be presented via a user interface to the first communicator to inform the first communicator of the time delay; and joining the temporary participant to the first communication session for the sub-session duration at a time at which the time delay occurs.

4. The method of claim 2, wherein the invitation response comprises a different sub-session duration from that contained in the session invitation, wherein the different sub-session duration is specified by the temporary participant, said method further comprising:

changing the sub-session duration to the different sub-session duration, wherein the determination that the sub-session has ended occurs upon the different session-duration expiring.

5. The method of claim 1, wherein the temporary participant is participating in a second communication session at the time that the sub-session is to start, said method comprising:

disconnecting the temporary participant from the second communication session without terminating the second communication session; and providing at least one participant of the second communication session with the sub-session duration so that a count-down for the sub-session duration is able to be presented to the at least one participant.

6. The method of claim 5, further comprising:

presenting the sub-session duration within a message sent to the at least one participant of the second communication session, wherein the message comprises information about the sub-session that was not manually input by the temporary participant.

7. The method of claim 5, wherein the second communication session is paused until the temporary participant is automatically removed from the first communication session, at which point the temporary participant is automatically connected to the second communication session so that the second communication is able to resume with the temporary participant as a participant.

8. The method of claim 5, wherein the second communication session comprises a two or more participants other than the temporary participant, wherein the second communication session continues between the second communication session during the sub-session duration during which the temporary participant is not included in the second communication session, said method further comprising: responsive to automatically removing the temporary participant from the first communication session, joining the temporary participant to the second communication session.

9. The method of claim 5, wherein the temporary participant utilizes a user interface of a communication device to participate within the first communication session, and wherein the temporary participant utilizes the user interface of the communication device to participate within the second communication session.

10. The method of claim 5, wherein the first communication session utilizes a first communication server and wherein the second communication session utilizes a second communication server, wherein the temporary participant takes no actions to be connected to the first communication session and to be disconnected from the second communication session other than accepting the session invitation.

11. The method of claim 1, wherein the temporary participant is participating in a second communication session at the time that the session invitation is to be conveyed to the temporary participant, said method comprising automatically denying the session invitation if the second communication session has a higher priority than the first communication session, wherein the priority is established based on organizational hierarchy of the first communicator and the temporary participant.

12. The method of claim 1, wherein the first communication session is an online meeting session.

13. The method of claim 1, wherein the first communication session is at least one of a video conference, a teleconference, an instant messaging session, and a chat session.

14. The method of claim 1, wherein the receiving of the session invitation, the conveying of the session information, the receiving of the invitation response, the joining of the temporary participant to the first communication session, the providing the sub-session duration information, and the removing the temporary participant from the first communication session are programmatic actions performed by an software executing within hardware of an application server connected to an internet protocol network.

15. The method of claim 1, further comprising managing the sub-session based, at least in part, upon an importance level of the sub-session, wherein the importance level of the sub-session depends on one or more of: content of the sub-session, participants in the sub-session, urgency level of the sub-session.

16. The method of claim 1, said method further comprising programmatically determining the sub-session duration.

17. The method of claim 1, wherein the temporary participant is communicating in a first communication mode and at least one other participant of the sub-session is communicating in a second communication format, said method further comprising dynamically converting communication streams between the first communication mode and the second communication mode during the sub-session.

18. The method of claim 1, further comprising indicating a mode of communication for the sub-session in the session invite to the temporary participant.

19. A method comprising:

presenting a user interface to a user, participating in an ongoing communication session with one or more remotely located other users, operable to enable the user to invite a temporary participant to join a sub-session of the ongoing communication session; said user interface comprising:

a first user interface element operable to enable the user to select a temporary participant; and a second user interface element operable to enable the user to set sub-session duration of the sub-session, said sub-session duration being less than the duration of the ongoing communication session;

preparing a session invite for the temporary participant, said session invite comprising the sub-session duration;

sending the session invite to the temporary participant; and upon starting of the sub-session, presenting a count-down of the sub-session duration to the user during the sub-session.

20. A method comprising:

presenting a user interface to a user through which the user is able to participate in real-time communication sessions conducted with sets of one or more remotely located people, said user interface comprising an invitation acceptance screen operable to present a sub-session duration when prompting the user to accept or deny an invitation to join a sub-session of an ongoing communication session, wherein the sub-session duration represents a duration which the user is to be part of the ongoing communication session should the user accept the invitation;

joining the user to the ongoing communication session responsive to acceptance of the invitation via the invitation acceptance screen;

presenting a countdown screen operable to present a user with a continually decrementing countdown time representing an amount left in the sub-session duration, where the countdown screen is presented to the user during the sub-session; and automatically disconnecting the user from the ongoing communication session when the sub-session duration expires.

* * * * *